(12) United States Patent
Bruce et al.

(10) Patent No.: US 7,248,210 B2
(45) Date of Patent: Jul. 24, 2007

(54) MAN-PORTABLE COUNTER MORTAR RADAR SYSTEM

(75) Inventors: Steven E. Bruce, Liverpool, NY (US); Thomas A. Wilson, Fayetteville, NY (US)

(73) Assignee: Syracuse Research Corporation, Syracuse, NY (US)

( * ) Notice: Subject to any disclaimer, the term of this patent is extended or adjusted under 35 U.S.C. 154(b) by 0 days.

(21) Appl. No.: 11/081,043

(22) Filed: Mar. 15, 2005

(65) Prior Publication Data
US 2006/0092075 A1    May 4, 2006

Related U.S. Application Data

(60) Provisional application No. 60/553,262, filed on Mar. 15, 2004.

(51) Int. Cl.
*G01S 7/02* (2006.01)
*H01Q 1/12* (2006.01)
*G01S 13/00* (2006.01)

(52) U.S. Cl. ........................... 342/175; 342/61; 342/62; 342/67; 342/82; 342/89; 342/118; 343/702; 343/720; 343/872; 343/878; 343/880; 343/881; 343/907; 343/912; 343/916

(58) Field of Classification Search ........ 343/872–892, 343/701, 702, 711–717, 720, 907–916; 342/21, 342/22, 27, 28, 59, 82–103, 118, 125, 134–144, 342/175, 187, 192–197, 53, 42, 44, 52, 61–68
See application file for complete search history.

(56) References Cited

U.S. PATENT DOCUMENTS

| | | | | |
|---|---|---|---|---|
| 2,550,700 A | * | 5/1951 | Lancor, Jr. et al. ........... | 342/52 |
| 2,573,682 A | * | 11/1951 | Barret ......................... | 343/877 |
| 3,176,302 A | * | 3/1965 | Tipton ......................... | 343/872 |
| 3,315,257 A | * | 4/1967 | Sauberlich ................... | 342/125 |
| 3,417,394 A | * | 12/1968 | Sauberlich ................... | 342/52 |
| 3,432,853 A | * | 3/1969 | Wise ........................... | 342/187 |
| 3,745,569 A | * | 7/1973 | Works et al. ................ | 342/44 |
| 4,746,867 A | * | 5/1988 | Gunton ........................ | 342/22 |
| 4,820,041 A | * | 4/1989 | Davidson et al. ............. | 342/53 |
| 5,841,392 A | * | 11/1998 | Kishimoto ................... | 342/125 |
| 6,917,414 B2 | * | 7/2005 | Stierle et al. ............... | 342/118 |
| 7,042,385 B1 | * | 5/2006 | Wichmann ................... | 342/22 |

\* cited by examiner

*Primary Examiner*—Bernarr E. Gregory
(74) *Attorney, Agent, or Firm*—George R. McGuire; Bond, Schoeneck & King, PLLC

(57) ABSTRACT

The present invention is a man-portable counter-mortar radar (MCMR) radar system that detects and tracks enemy mortar projectiles in flight and calculates their point of origin (launch point) to enable and direct countermeasures against the mortar and its personnel. In addition, MCMR may also perform air defense surveillance by detecting and tracking aircraft, helicopters, and ground vehicles. MCMR is a man-portable radar system that can be disassembled for transport, then quickly assembled in the field, and provides 360-degree coverage against an enemy mortar attack. MCMR comprises an antenna for radiating the radar pulses and for receiving the reflected target echoes, a transmitter that produces the radar pulses to be radiated from the antenna, a receiver-processor for performing measurements (range, azimuth and elevation) on the target echoes, associating multiple echoes to create target tracks, classifying the tracks as mortar projectiles, and calculating the probable location of the mortar weapon, and a control and display computer that permits the operation of the radar and the display and interpretation of the processed radar data.

20 Claims, 18 Drawing Sheets

MAN-PORTABLE COUNTER MORTAR RADAR SYSTEM

CROSS REFERENCE TO RELATED APPLICATION

The present application claims priority to U.S. Provisional Patent Application Ser. No. 60/553,262, filed Mar. 15, 2004.

FIELD OF INVENTION

The present invention relates to radar systems and, more specifically, to a man-portable counter mortar radar (MCMR) system capable of 360 degrees of coverage over extended ranges.

DESCRIPTION OF PRIOR ART

The mortar is a projectile weapon that launches explosive shells in high trajectories to penetrate enemy revetments and trenches and to inflict damage on enemy equipment and personnel. It is a light-weight, low-cost weapon, that can easily be carried and deployed by foot soldiers. The mortar can be operated effectively from dense cover, and can be moved quickly to different locations, to avoid counterattack.

Countering a mortar attack is a difficult technical and tactical problem, due to the ubiquity and flexibility of the weapon. The current practice consists of deploying a large and very accurate radar (for example, the United States AN/TPQ-36) to detect the incoming projectiles, compute their trajectory, and determine the launch point location. Then, an immediate counterattack can occur, using mortars or artillery, before the enemy can move his weapon.

Conventional counter-mortar radars are very large, vehicle mounted systems capable of 90 degrees of coverage. Such systems employ large, high-power, precision planar array antennas to determine accurate launch point locations at extended ranges. Present mortar-locating radars are also highly specialized to their single task, and have little capability for other useful radar functions; for example, defense against attack by airplanes or helicopters. The radar system cannot be moved quickly, thus rendering it vulnerable to mortar attack. The radar is also sufficiently costly, in equipment and operating personnel, that only a limited number can be assigned to any single battalion.

OBJECTS AND ADVANTAGES

It is a principal object and advantage of the present invention to provide a portable counter mortar radar system that is carried or moved with ease.

It is an additional object and advantage of the present invention to provide a portable counter mortar system capable of 360 degrees of azimuth coverage.

It is a further object and advantage of the present invention to provide a portable counter mortar system capable of mortar location to 5 kilometers with a fifty percent CEP accuracy of 100 meters.

Other objects and advantages of the present invention will in part be obvious, and in part appear hereinafter.

SUMMARY OF INVENTION

The present invention comprises a man-portable counter mortar radar (MCMR) system including a cylindrical phased array antenna mounted on a tripod to provide 360 degrees of azimuth coverage. A receiver-signal processor (RSP) unit is interconnected to the phased array antenna and provides signal conversion, detection, tracking and weapon location. The MCMR system is operated locally by a notebook computer. Power for the MCMR system may be provided by vehicle auxiliary power, a small gasoline generator, or from battery depending upon the particular situation and duration of operation.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate a preferred embodiment of the invention, and together with the description serve to explain the principles and operation of the invention.

BRIEF DESCRIPTION OF DRAWINGS

The present invention will be further understood and appreciated by reading the following Detailed Description in conjunction with the accompanying drawings, in which.

DETAILED DESCRIPTION

Figure 1:
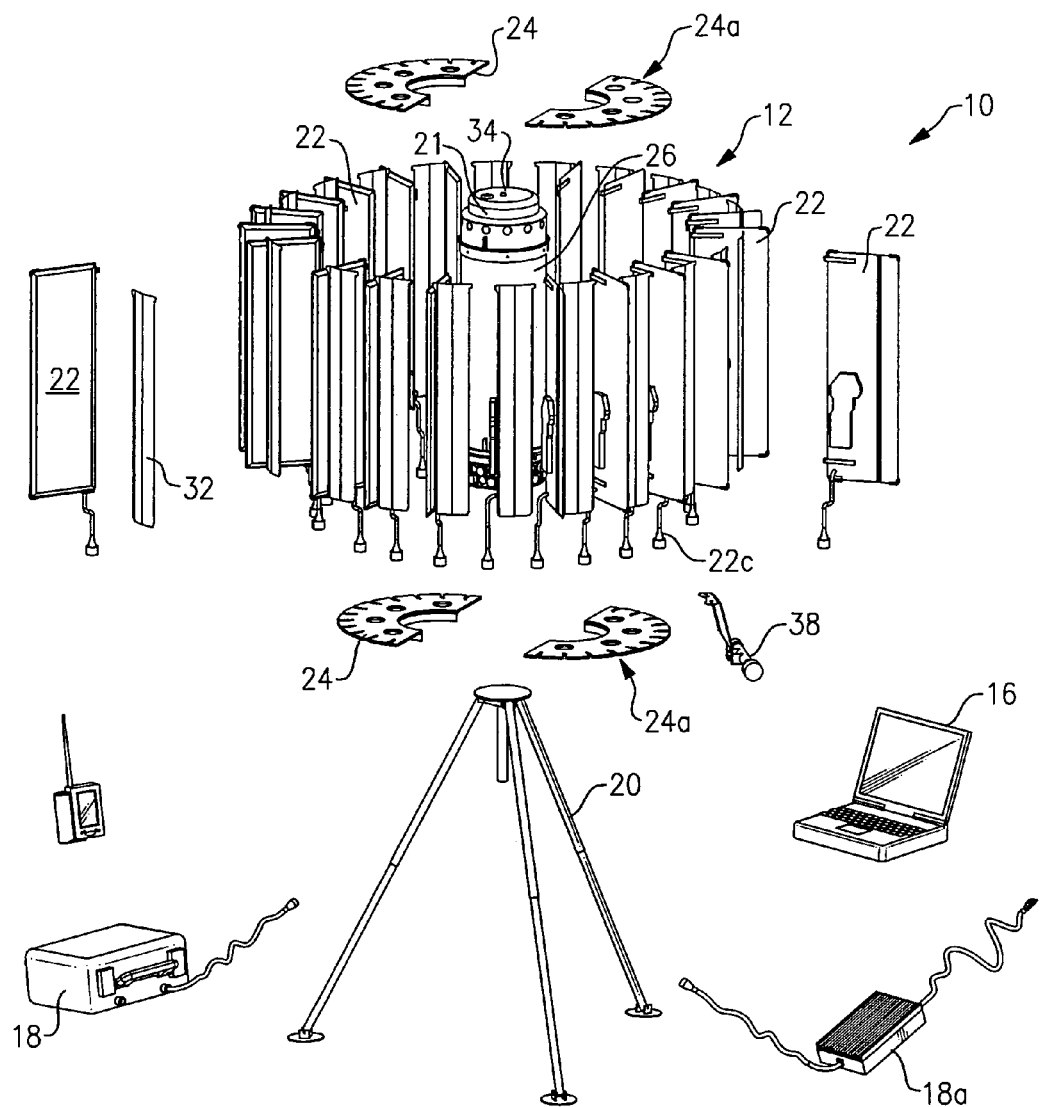
FIG. 1 is an exploded perspective view of a MCMR system according to the present invention.

Referring now to the drawings, wherein like numerals refer to like parts throughout, there is seen in FIG. 1 a MCMR system 10 according to the present invention. MCMR system 10 generally comprises an antenna 12, a laptop computer 16, and a power supply 18.

Figure 2:
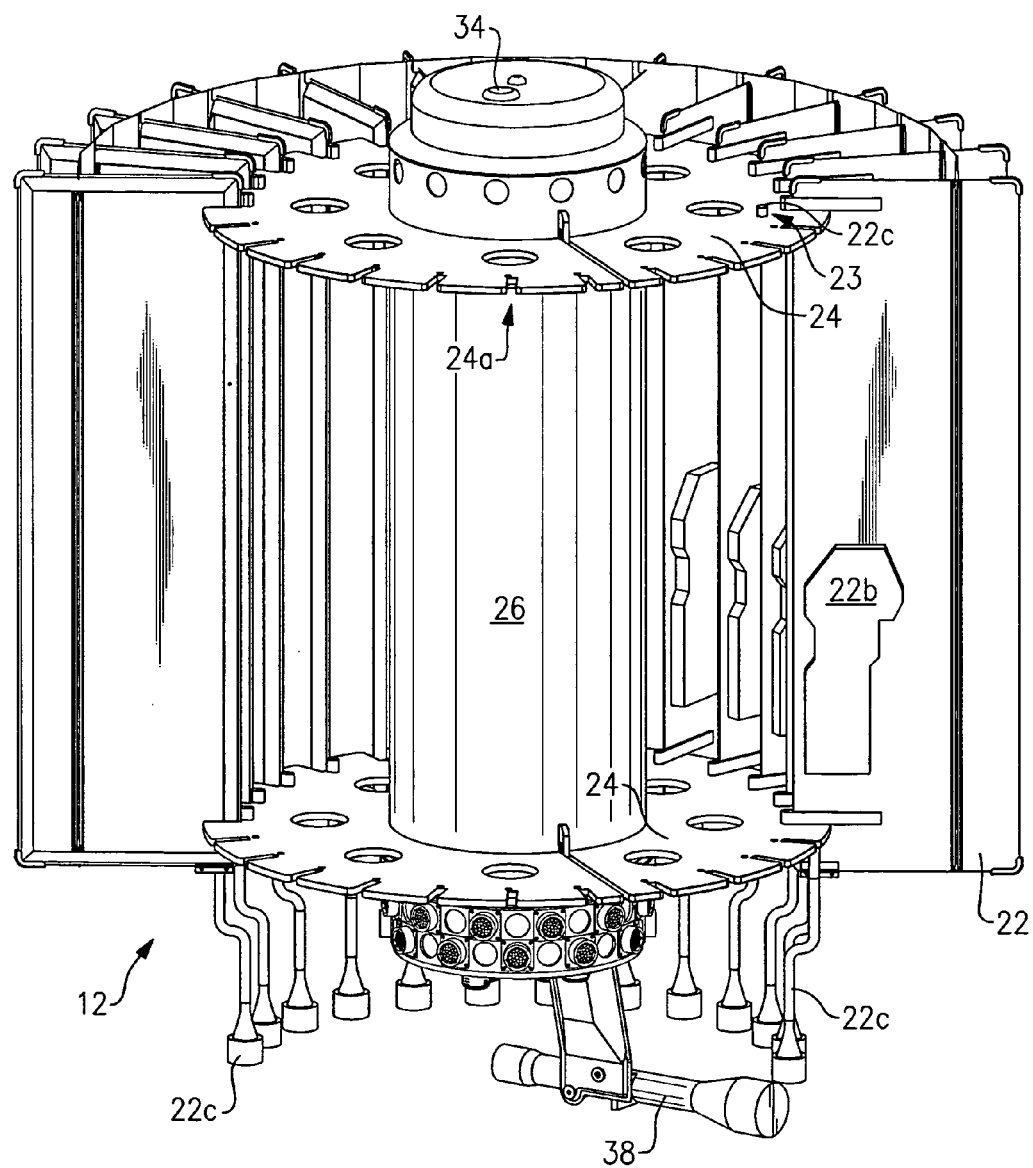
FIG. 2 is a perspective cutaway of an antenna array according to the present invention.

Referring to FIG. 2, antenna 12 comprises an L-band, 24-column cylindrical phased array radar mounted on a lightweight tripod 20. Antenna 12 scans electronically in azimuth using an electronic matrix switch and has a pair of fixed elevation beams. Both azimuth and elevation monopulse angle measurement is used to provide accurate three-dimensional target coordinates (range, azimuth, and elevation).

Figure 16:
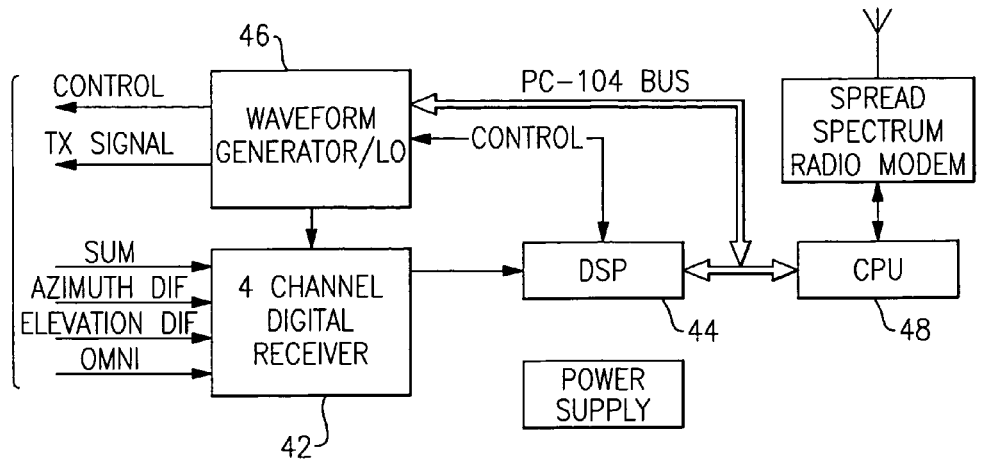
FIG. 16 is a block diagram of the radar electronics that are housed in the antenna cylinder according to the present invention.
Figure 17:
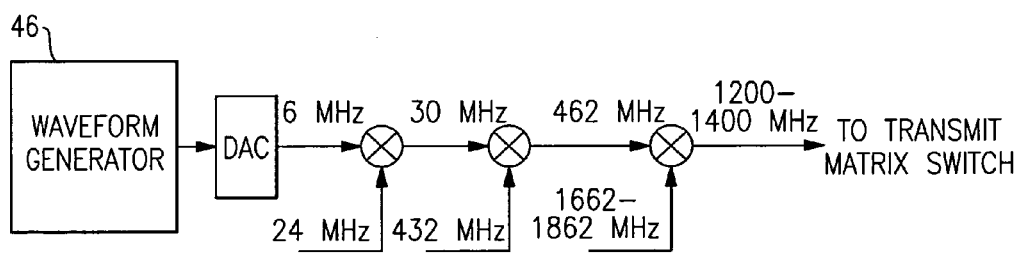
FIG. 17 is a block diagram of a waveform generator according to the present invention.

Antenna 12 is constructed of 24 radially extending antenna panel columns 22, spaced at fifteen degrees and mounted by support rings 24 to a central antenna cylinder 26 that houses a transmit matrix assembly 28 and receive matrix switch assembly 30 of which there are two, as well as a receiver 42, digital signal processor 44, waveform generator 46, and CPU 48, as illustrated in FIG. 16. Antenna panel columns 22 can be removed and stacked for transport, and can be quickly reassembled when the radar is deployed.

Figure 3:
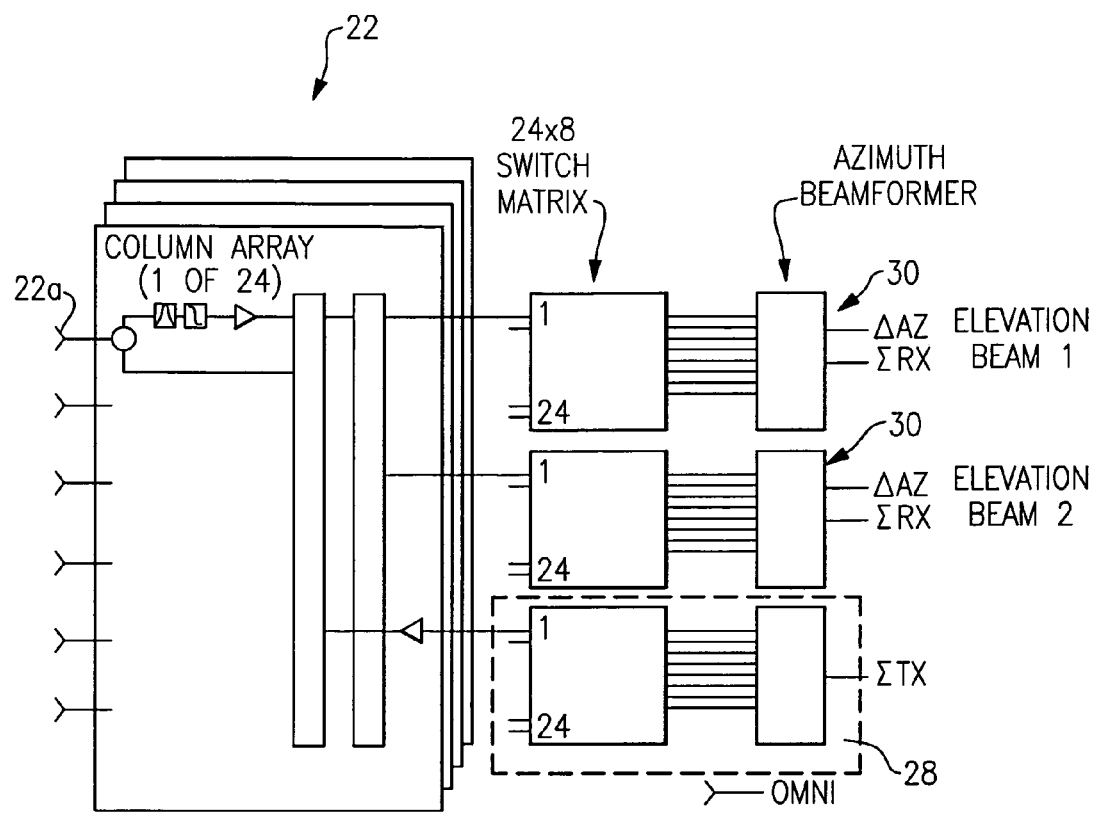
FIG. 3 is a schematic of the circuitry for the electronically steered antenna array according to the present invention.
Figure 4A:
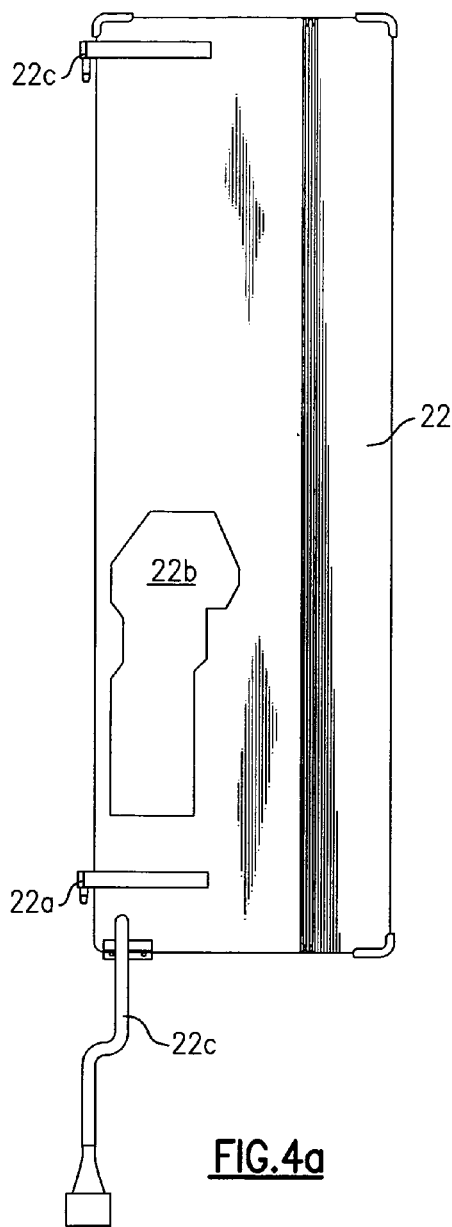
FIGS. 4a and 4b are opposing side elevation views of an antenna column panel according to the present invention.
Figure 4B:
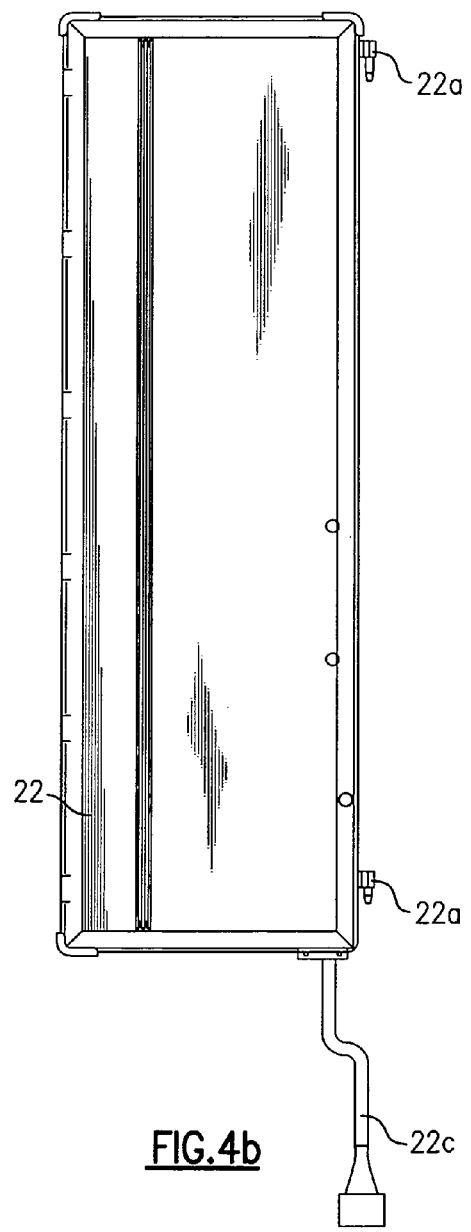

Referring to FIGS. 3 and 4, each panel column 22 is an etched substrate containing six vertically polarized dipole elements 22a, each with a pre-selector filter, limiter, and low noise amplifier. The six elements are combined on panel column 22 to form two stacked elevation beams that are offset in elevation angle by 17 degrees. A single elevation beam is generated on transmit, centered on the lower receive elevation beam. The elevation beams are independently tapered in amplitude and phase to reduce the below the horizon elevation angle sidelobes to suppress the effects of ground-bounce multipath. Each panel column 22 also contains a pair of solid-state power amplifiers 22b that generate 30 Watts of peak RF power at up to a 10% duty cycle. Each power amplifier drives three elements through an unequal split, three-way power divider. Panel column 22 further comprises cable connectors 22c for electrical interconnection to radar electronics housed in central antenna cylinder 26 and longitudinal slots 22d formed parallel and adjacent to their respective inner edges. In addition, each panel 22 includes a placement pin 22e that engages an opening 23 formed through support rings 24 in axial alignment with the slots 24a to further ensure accurate alignment of the panels relative to cylinder 26.

Each of the elevation receive beam RF signals and the transmitter RF signal from each column are fed into a 24 to 8 electronic matrix that instantaneously selects an 8 column sector and reorders the columns appropriately for the azimuth beamformers. For each azimuth dwell period only 8 of the 24 columns are active. On reception, the azimuth beamformers form an azimuth sum beam and an azimuth difference beam with independent amplitude tapering for optimal sidelobe suppression. The transmit beam is untapered in azimuth.

Figure 5:
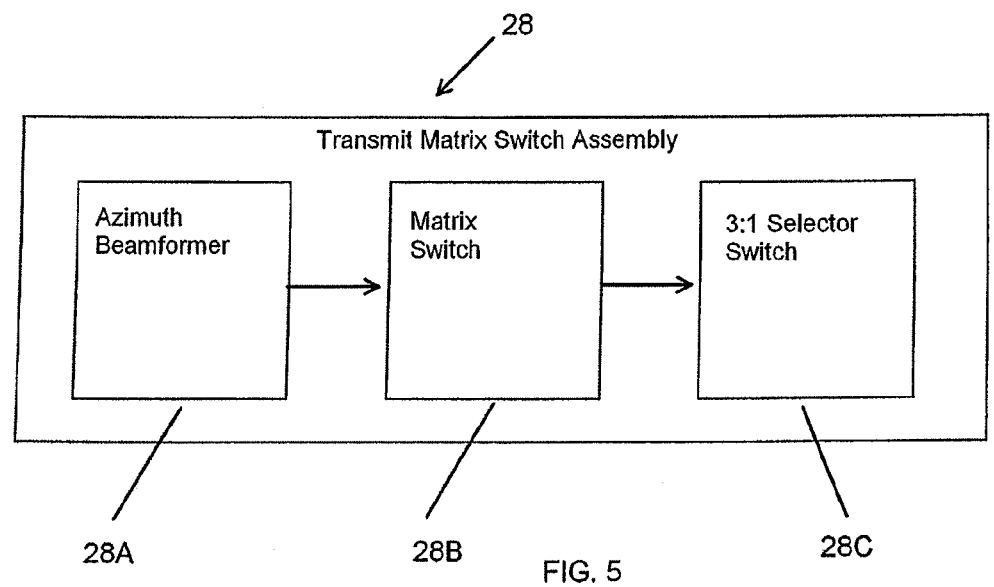
FIG. 5 is a photograph of a transmit matrix switch assembly according to the present invention.

Referring to FIG. 5, transmit matrix switch assembly 28 includes an azimuth beamformer 28a that creates the eight equally weighted transmit signals that form the transmit beam. A matrix switch 28b provides beam steering by routing the eight transmit signals to the appropriate eight antenna columns 22 through a 3:1 selector switch 28c.

Figure 6:
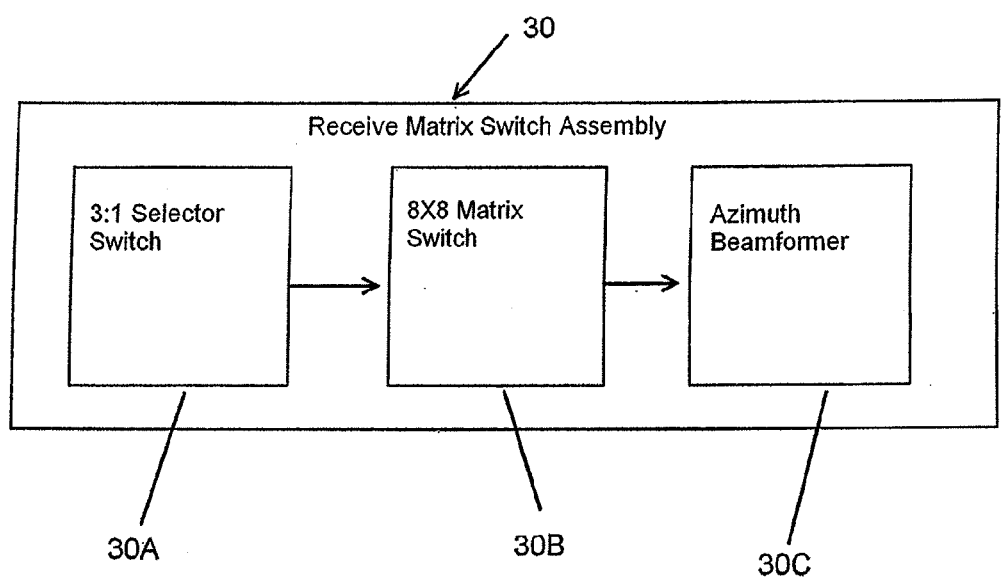
FIG. 6 is a photograph of a receive matrix switch assembly according to the present invention.

Referring to FIG. 6, receive matrix switch assembly 30 works in reverse of transmit matrix 28 and routes received signals from each of the eight active antenna columns 22 through 3:1 selector switch 30a and an 8×8 matrix switch 30b to an azimuth beamformer 30c. Azimuth beamformer 30c forms sum and difference beams on receipt of signals.

Figure 7:
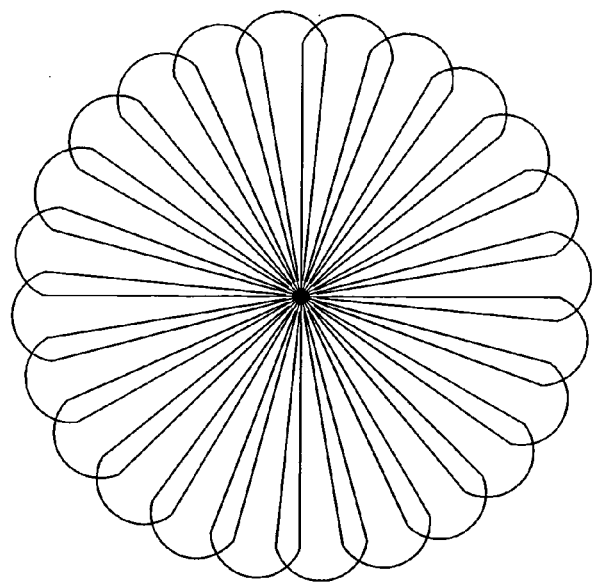
FIG. 7 is a schematic of antenna beam positions according to the present invention.
Figure 8:
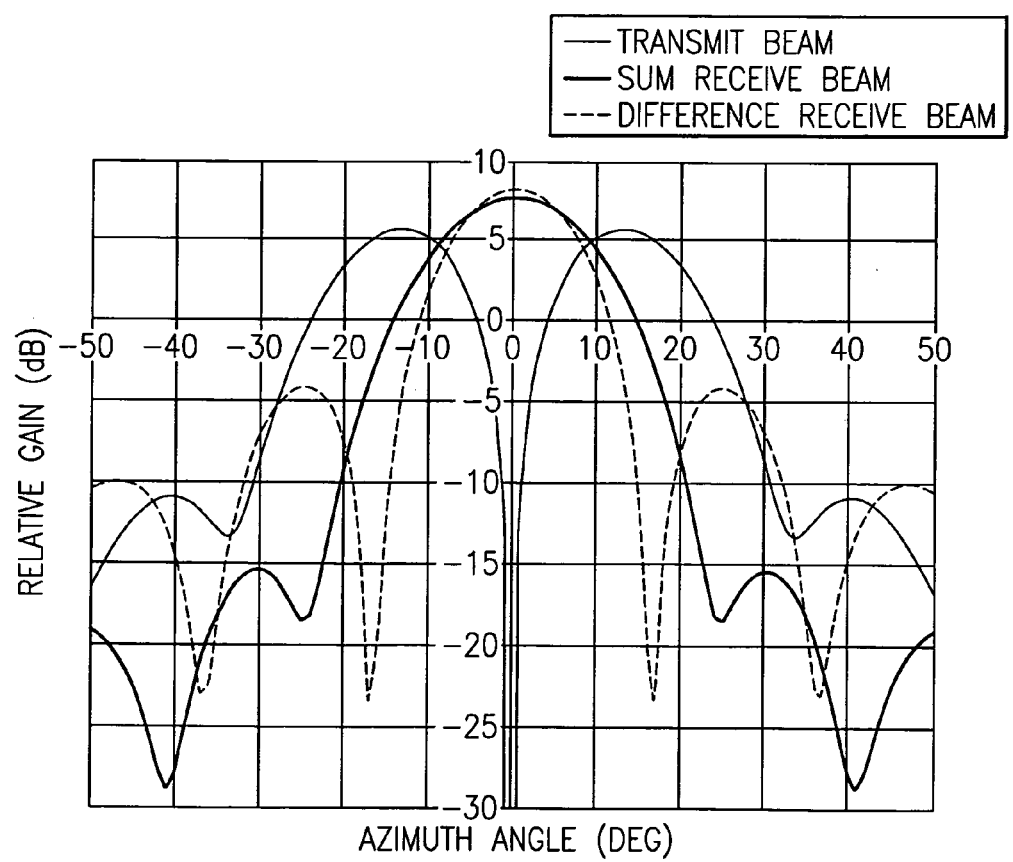
FIG. 8 is a graph of azimuth beam patterns according to the present invention.
Figure 9:
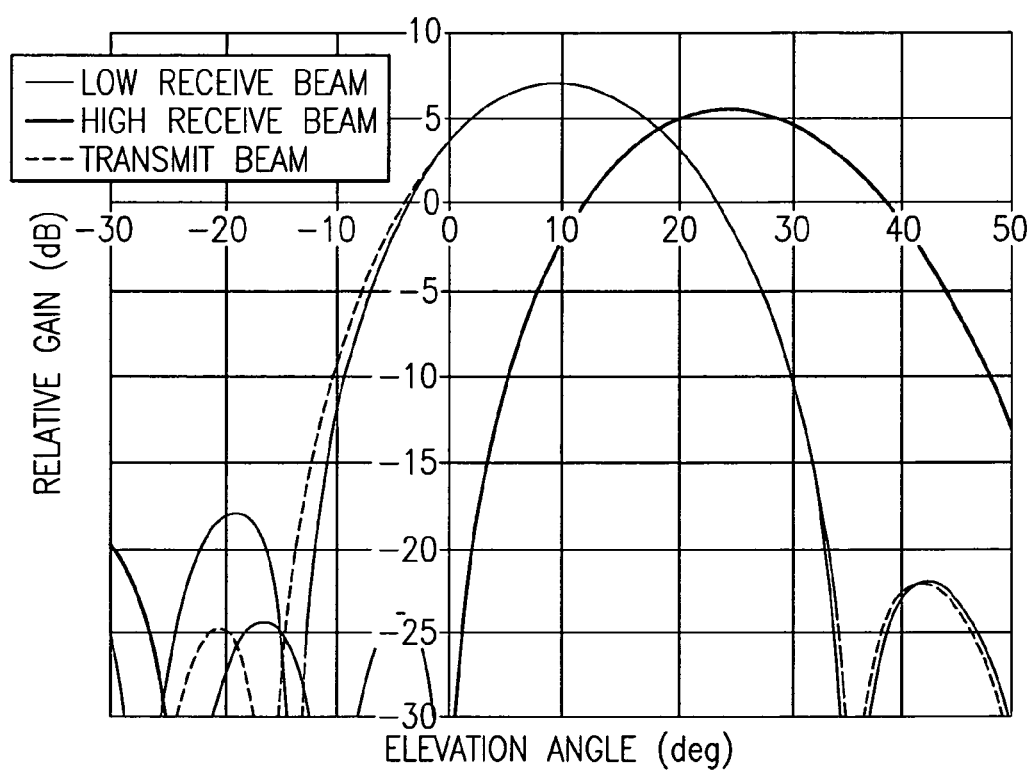
FIG. 9 is a graph of elevation beam patterns according to the present invention.
Figure 10:
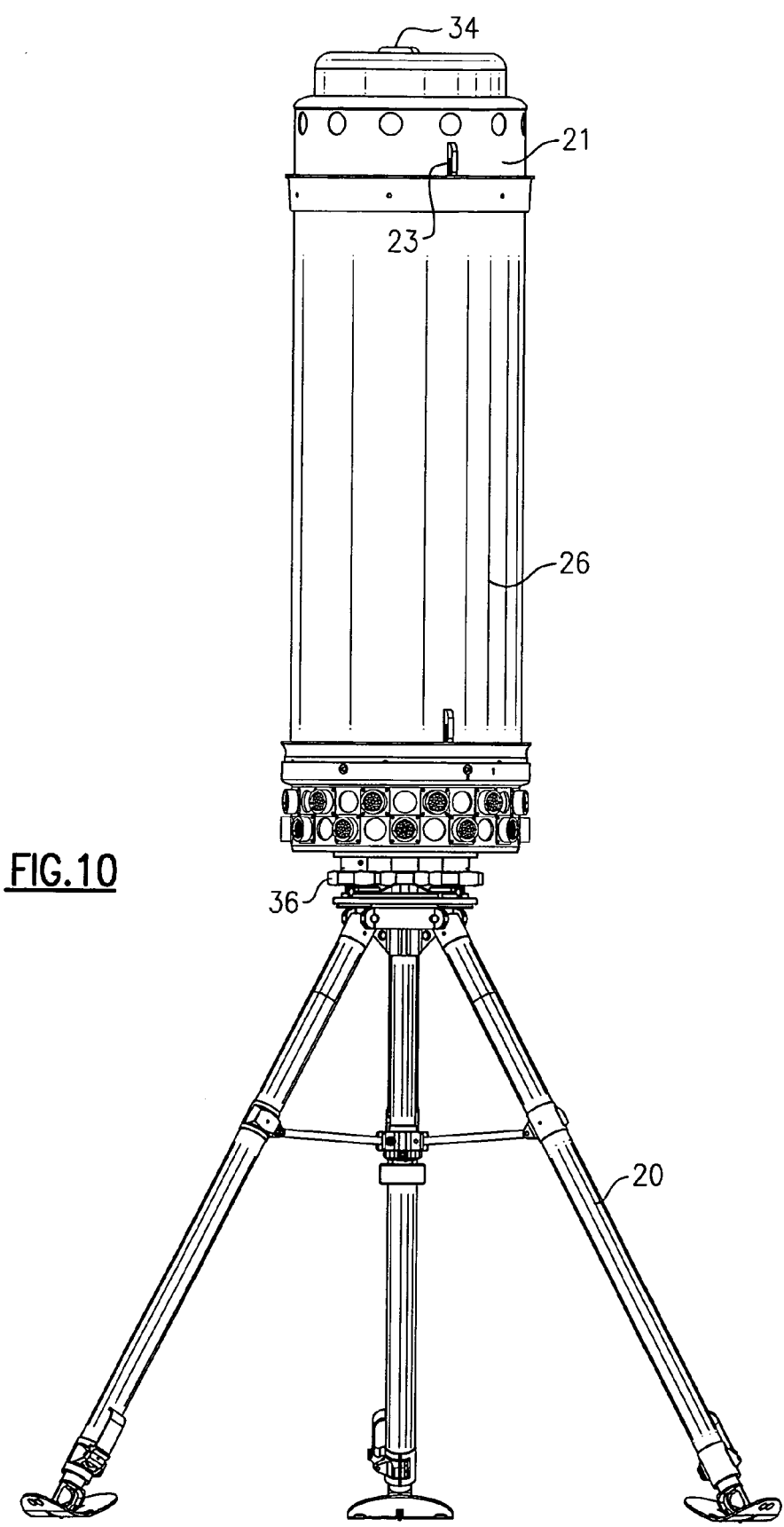
FIGS. 10-13 are elevation views of an MCMR at various stages of assembly.

MCMR 10 has 24 azimuth beam positions 15 degrees apart. The azimuth 3-db beamwidth is slightly wider at 18.7 degrees. A diagram of the 24 azimuth beams is seen in FIG. 7 and FIG. 8 depicts the transmit, receive sum, and difference beam patterns in azimuth. FIG. 9 illustrates the three elevation beam patterns of antenna 12, i.e., the transmit beam, lower receive beam, and upper receive beam.

Referring to FIGS. 10-16, antenna 12 is constructed on top of tripod 20. Tripod 20 includes a tri-bracketed connector 36 having thumbwheels for leveling antenna 12 and a boresight scope 38 for aligning antenna 12 in azimuth.

Figure 11:
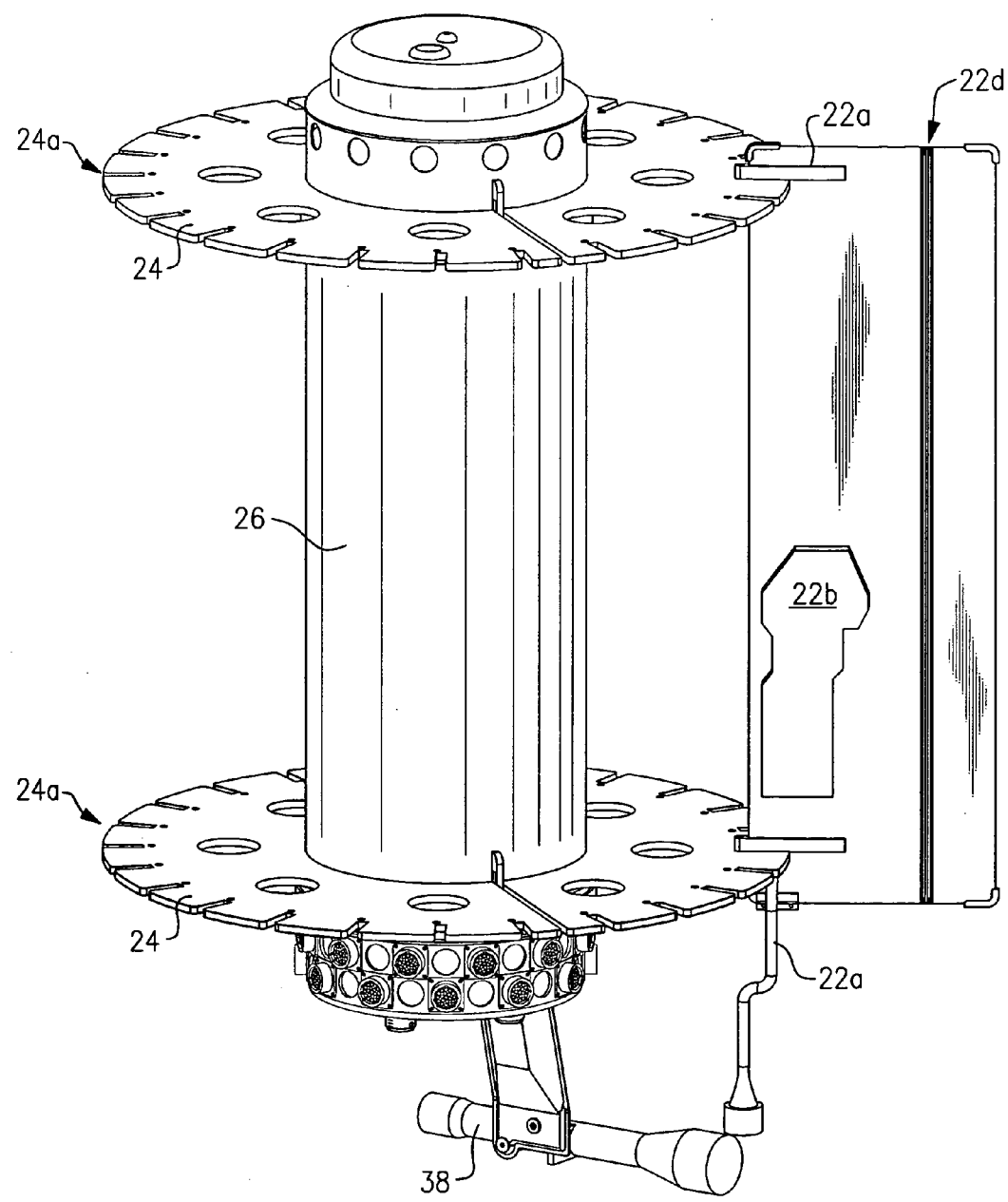
Figure 12:
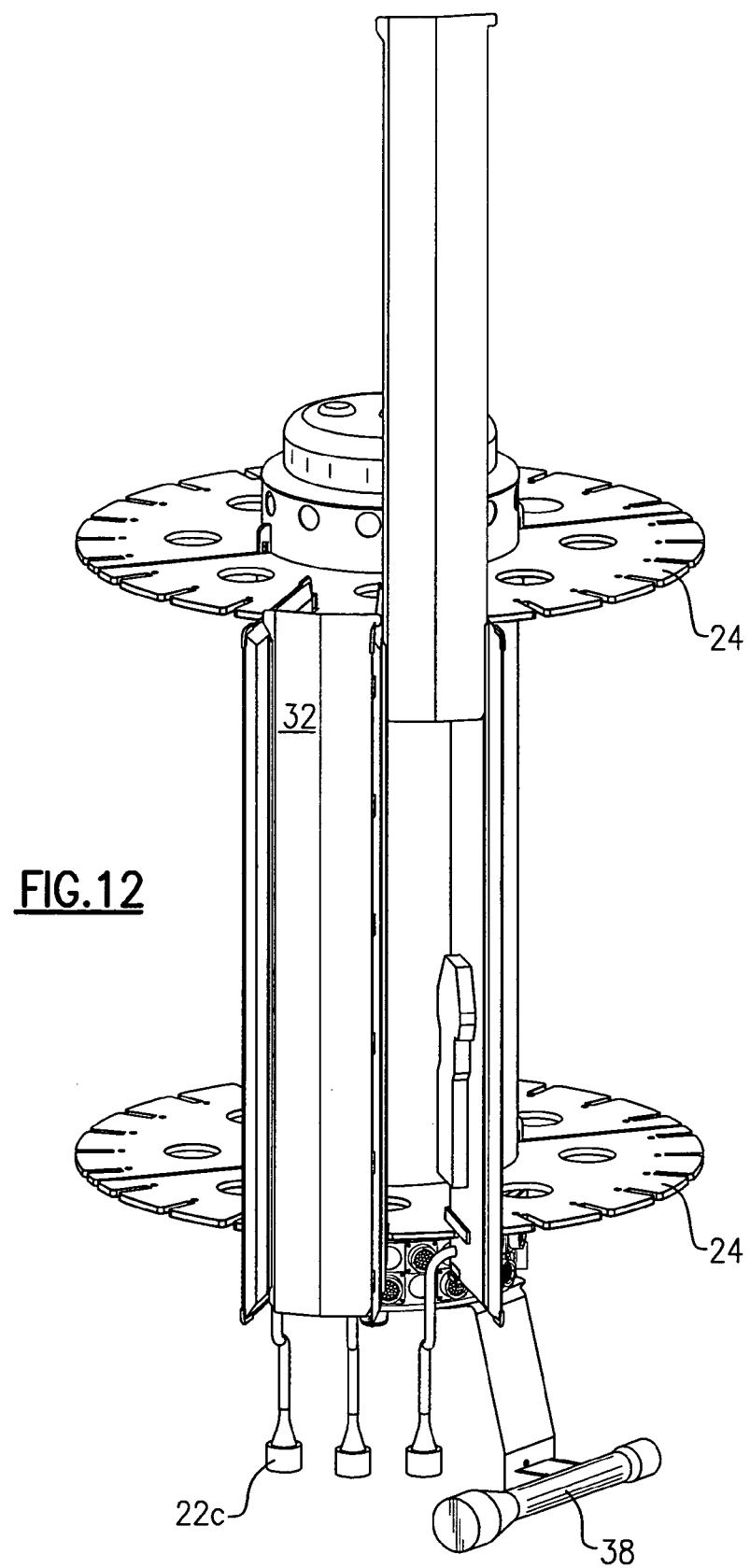
Figure 13:
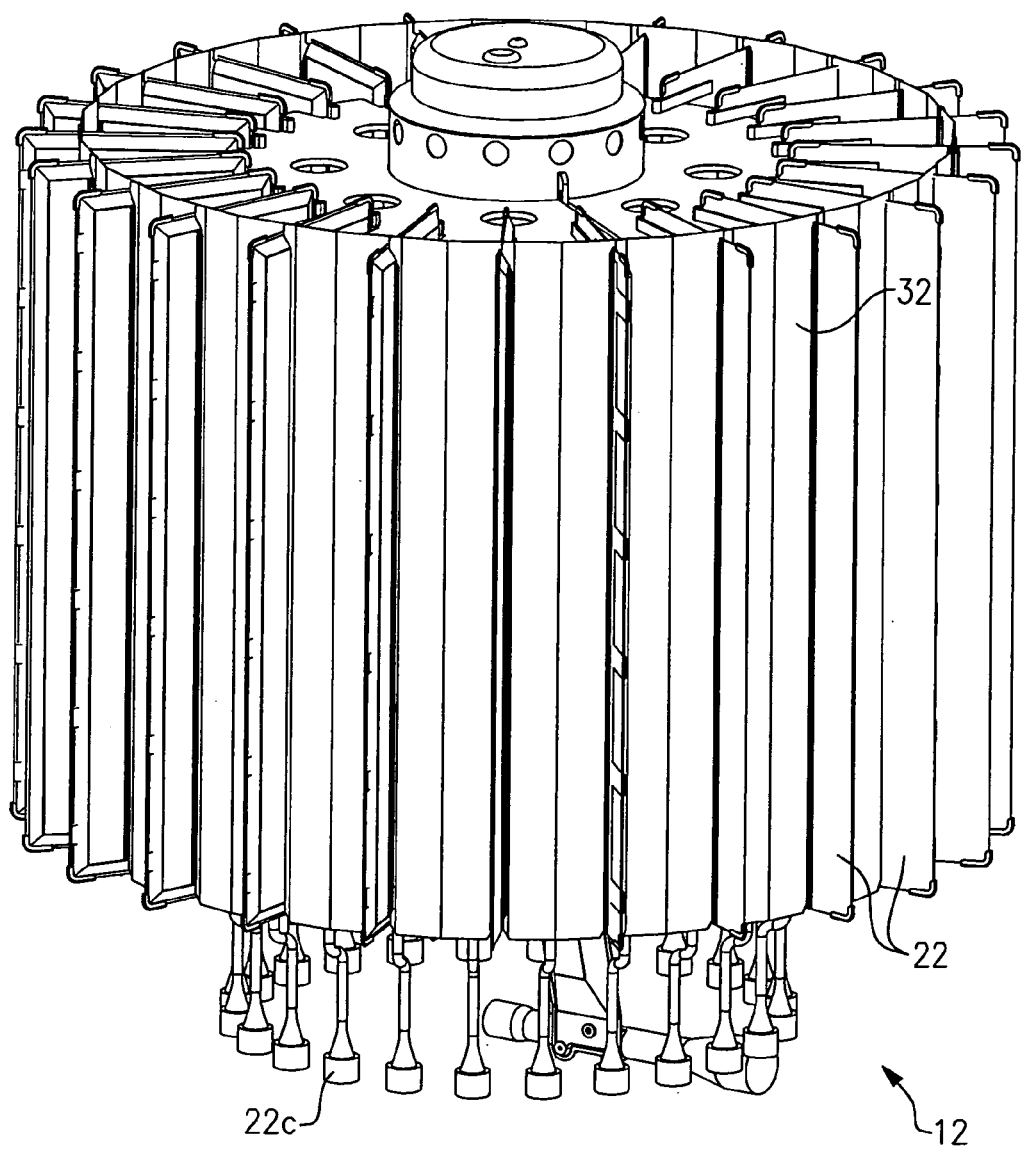
Figure 14:
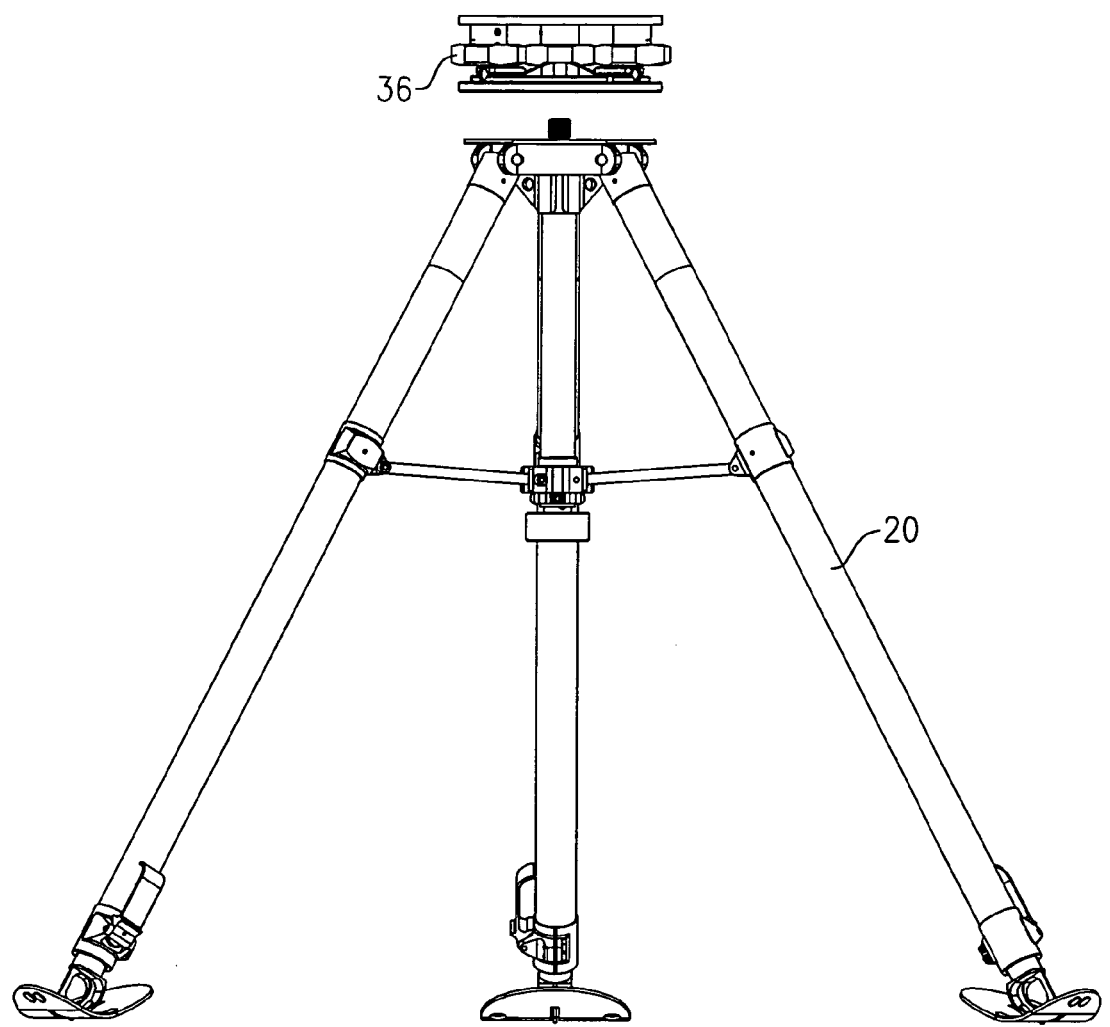
FIG. 14 is an elevation view of a tripod according to the present invention.

Antenna cylinder 26 is positioned on tripod 20. Two (top and bottom) or three (top, bottom, and intermediate) levels of support rings 24 consisting of multiple interlocking panels are mounted around the base, middle, for added stability if needed, and top of antenna cylinder 26. As seen in FIG. 11, support rings 24 have a series of twenty-four circumferentially spaced slots 24a for accepting a longitudinal peripheral edge of panel columns 22. Panel columns 22 are then mounted to support rings 24 using slots 24a. Once panel columns are in position, a series of ground planes 32 are positioned between adjacent columns 22 by slidingly engaging the peripheral edges into longitudinal slots 22d. Cable connectors 22c of panel columns 22 are then engaged with corresponding connectors 26a on antenna cylinder 26 to electrically interconnect antenna electronics of panel columns 22 with transmit matrix switch assembly 26 and receive matrix switch assembly 30 housed within antenna cylinder 26.

A small monopole 34 may be placed over antenna 12 (on top of cylinder 26) to provide an omnidirectional beam used for sidelobe blanking. Monopole 34 generates a hemispherical pattern with a null at zenith.

Figure 15:
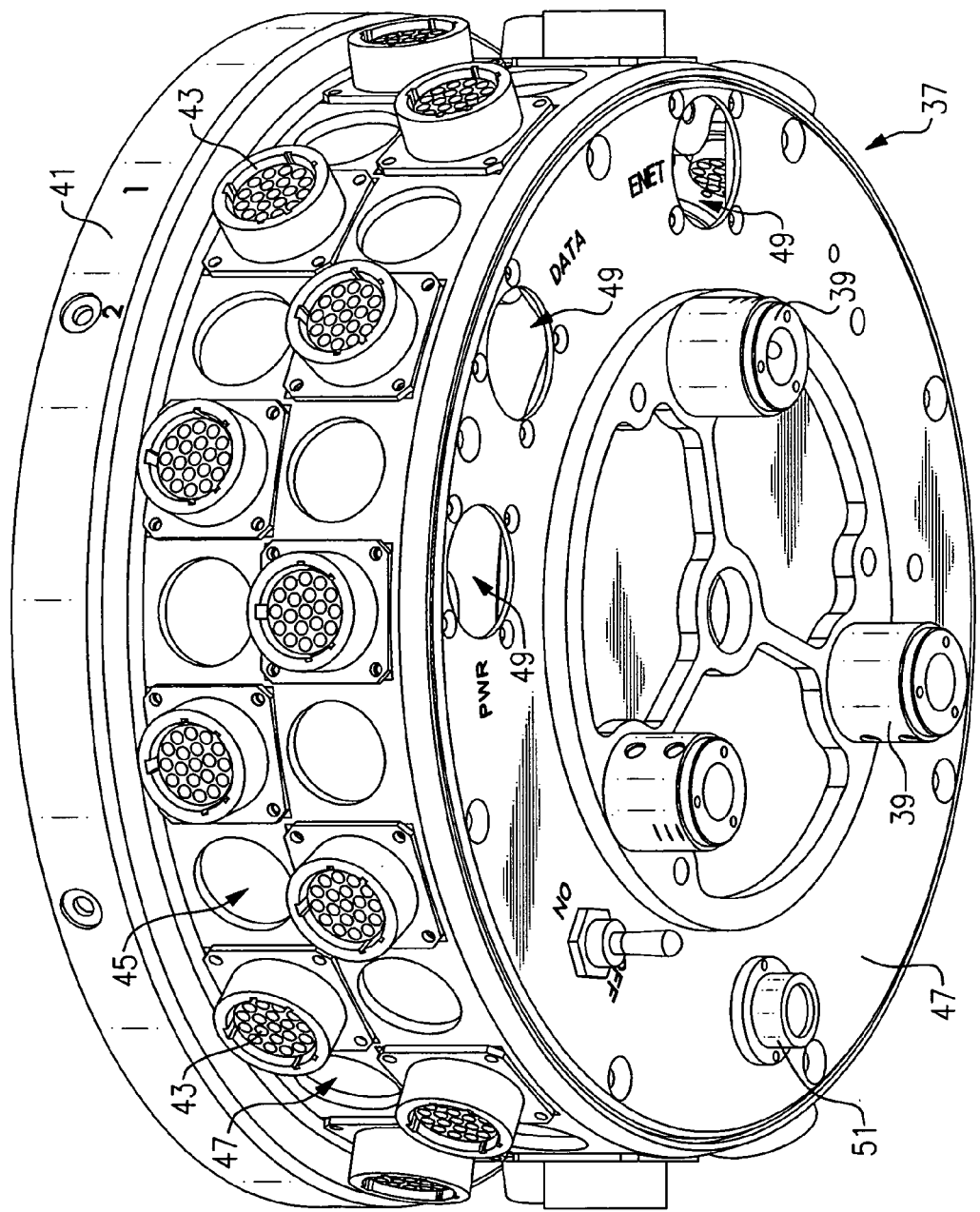
FIG. 15 is a perspective view of an antenna connector ring for interconnecting the antenna cylinder to the tripod.

With reference to FIG. 15, an antenna connector ring 37 may be used to interconnect antenna cylinder 26 to tri-bracket connector 36. Connector ring 37 includes brackets 39 that securely receive the thumbwheels of connector 36, and further includes a circumferential sidewall 41 that envelops the lower portion of cylinder 26, and a plurality of electrical interconnects 43 and vent openings 45 for connecting cylinder 26 to interface with antenna panels 22. A base plate includes openings 49 for power cables, data cables, Ethernet cables, and the like. A bubble level 51 provides visual indication of the level of MCMR System 10 relative to the ground.

Figure 18:
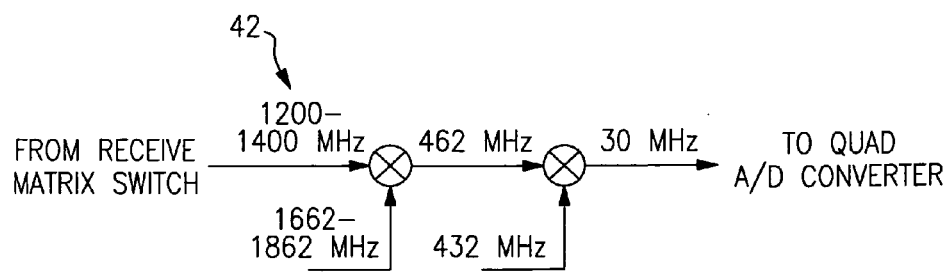
FIG. 18 is a block diagram of a receiver downconvertor according to the present invention.

As shown in FIG. 16, radar electronics comprise a four channel digital receiver 42, a digital signal processor (DSP) 44, a coherent waveform generator 46 including local oscillators, and a data processor or CPU 48. Waveform generator 46 digitally generates a coherent linear FM pulse at 6 MHz IF. The IF waveform is up-converted to L-band using a three-stage up-converter. The output of waveform generator 46 is sent to a transmit matrix module for distribution to appropriate antenna columns 22. A block diagram for waveform generator 46 is seen in FIG. 18.

Digital receiver 42 uses a double-conversion superheterodyne design with an output IF of 30 MHz. Receiver 42 has four channels: low beam sum, low beam azimuth difference, upper beam sum, and omni. Receiver 42 outputs are fed into a four channel A/D converter card that directly samples the four 30 MHz IF signals with an A/D converter as a sample rate of 24 MHz. The four channels are then converted into a baseband complex signal using a digital downconverter, implemented in a field programmable gate array with an internal clock rate of 144 MHz. The complex data is sent to DSP 44 using high-speed data links. A block diagram for receiver 42 is seen in FIG. 18.

Figure 19:
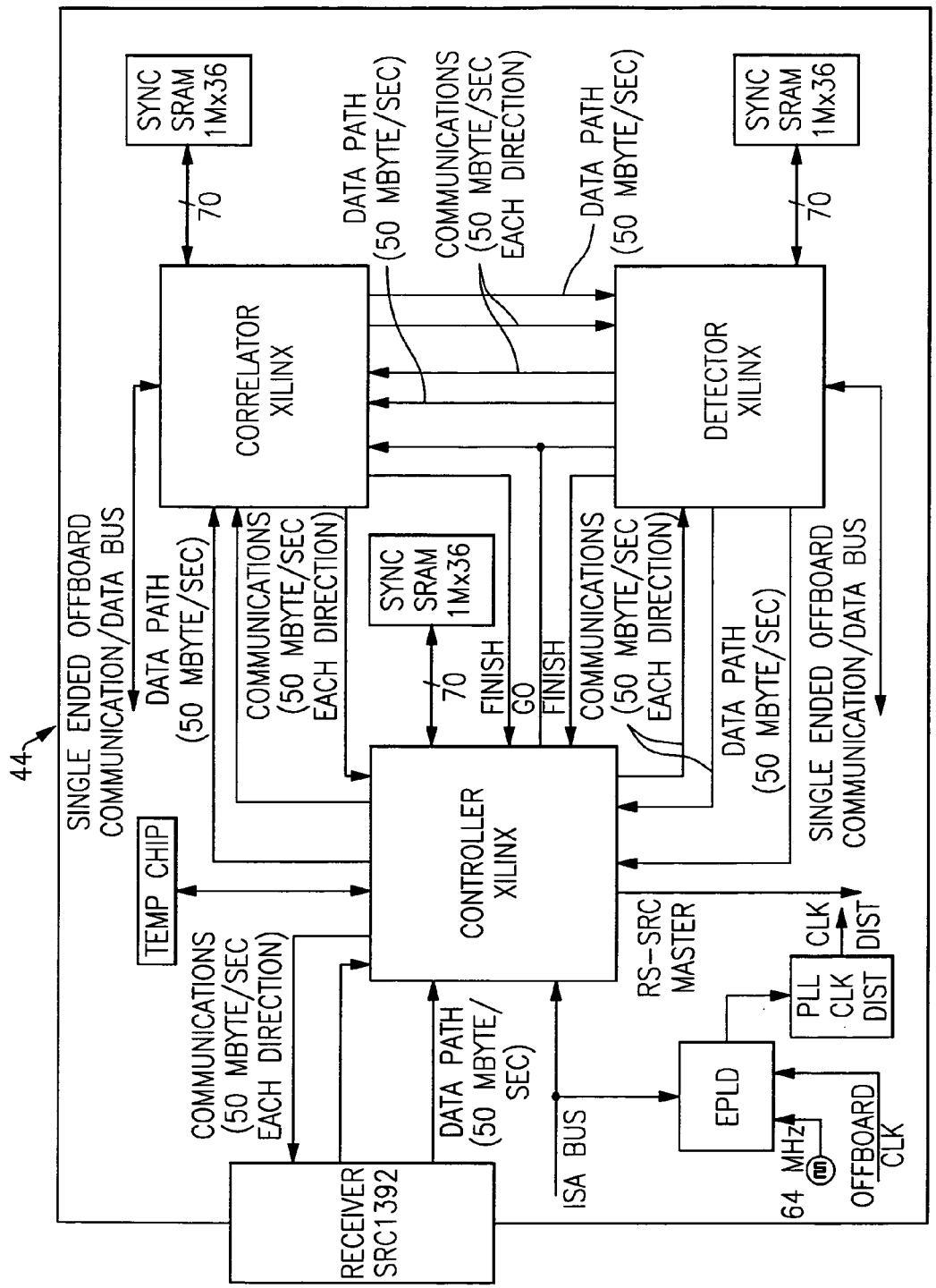
FIG. 19 is a block diagram of a digital signal processor according to the present invention.

Referring to FIG. 19, DSP 44 comprises three high-speed field programmable gate arrays (FPGAs), such as a Xilink Virtex-EM having more than 9 billion usable operations per second. Each FPGA node has 4 Mbytes of 100 MHz static RAM. There are 50 MBPS bi-directional communication links and 50 MBPS data channel loops between each node. A constant false alarm rate (CFAR) detector extracts target detections from the lower sum beam while rejecting clutter and other extraneous returns. Once a detection is declared in the lower sum beam, the corresponding data in the azimuth difference beam, the upper sum beam, and the omni channel are used for azimuth and elevation angle determination and for detecting side-lobe targets. All detection data are sent to the embedded CPU 28 for further processing.

Embedded CPU 48 is a single board computer that is PC/104 compatible and has four serial channels, 48 digital I/O lines and 10/100 Ethernet networking capability. For example, a WinSystems EBC-TXPLUS configured with an Intel Pentium 166 MHz processor is acceptable. CPU 48 operates the radar. For each multiple-pulse radar dwell, CPU 48 selects that azimuth beam position, chooses the waveform to be transmitted, and receives resulting detections. CPU 48 also processes detection data to provide range and angle sidelobe blanking, monopulse angle measurement, fine range measurement, and single scan correlation. The processed detection data is then sent to laptop computer 16 for additional processing and display.

Laptop computer 16 is used for radar control and display, as well as data processing. Embedded CPU 48 sends processed detections to laptop 16 for processing by target tracking software. Target track files are maintained on all detected targets. Once sufficient track points are collected on a target, the data is processed by a discriminator that makes an initial determination as to whether the target is a projectile. All targets that discriminate as projectiles are then processed by a trajectory estimator that performs a more detailed target discrimination function to help eliminate false launch point locations from being generated. The trajectory estimator uses a Kalman filter technique to estimate the launch and impact points from the target track data. The target detections, track, launch points, and impact points are all displayed on a PPI display on laptop 16.

Power for MCMR system 10 may be provided by a conventional AC-DC power supply 18a singularly or in conjunction with portable battery/generator 18.

Figure 20:
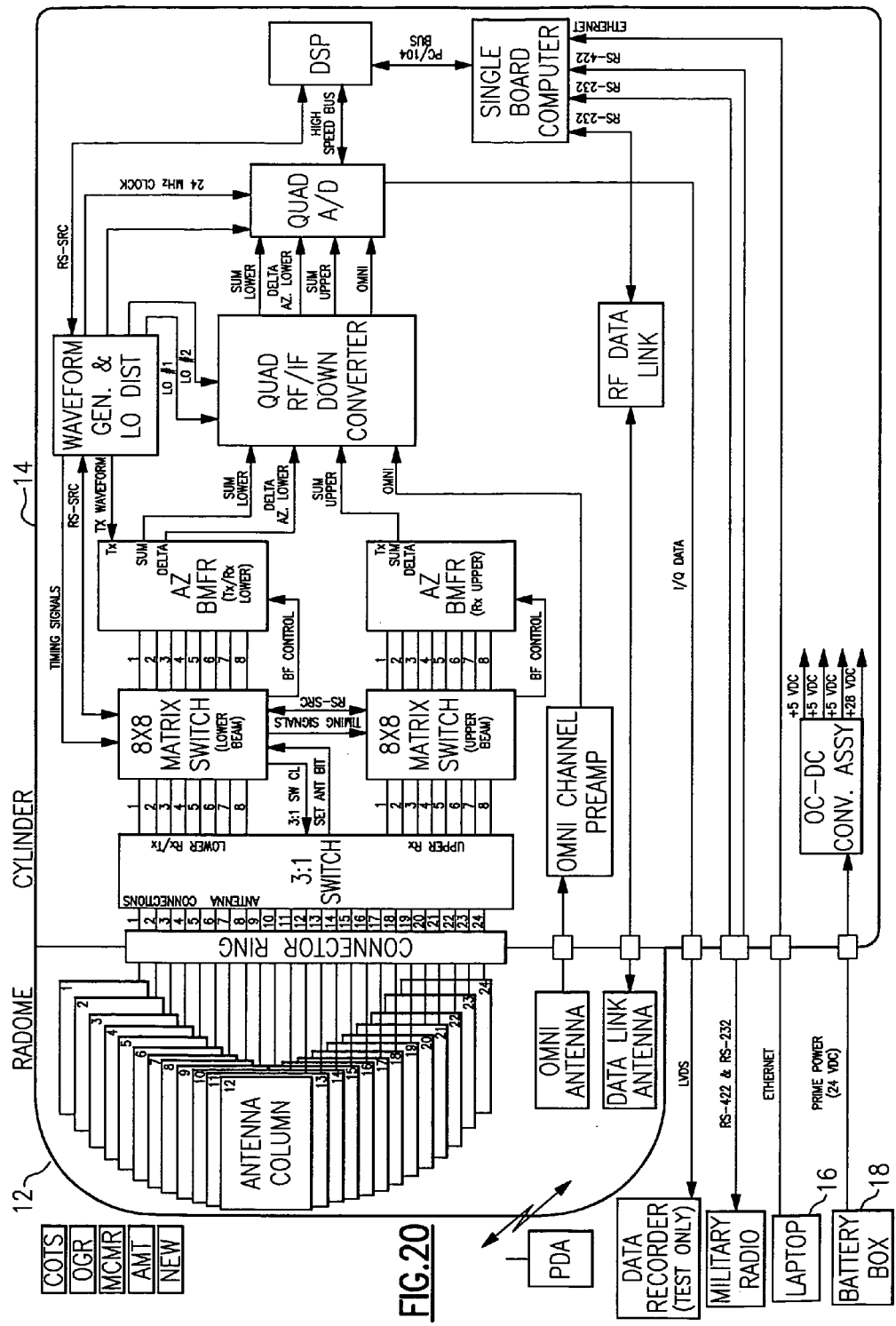
FIG. 20 is a block diagram of the hardware of an MCMR system according the present invention.

FIG. 20 illustrates the interconnection of the various hardware comprising MCMR 10, such as antenna columns 22, laptop 16, power source (e.g., battery box) 18, and receiver-signal processor 14 housed in antenna cylinder 26. Programmable firmware and software operations occur largely in digital signal processor 44 and laptop 16, and are discussed in greater detail hereafter.

Figure 21:
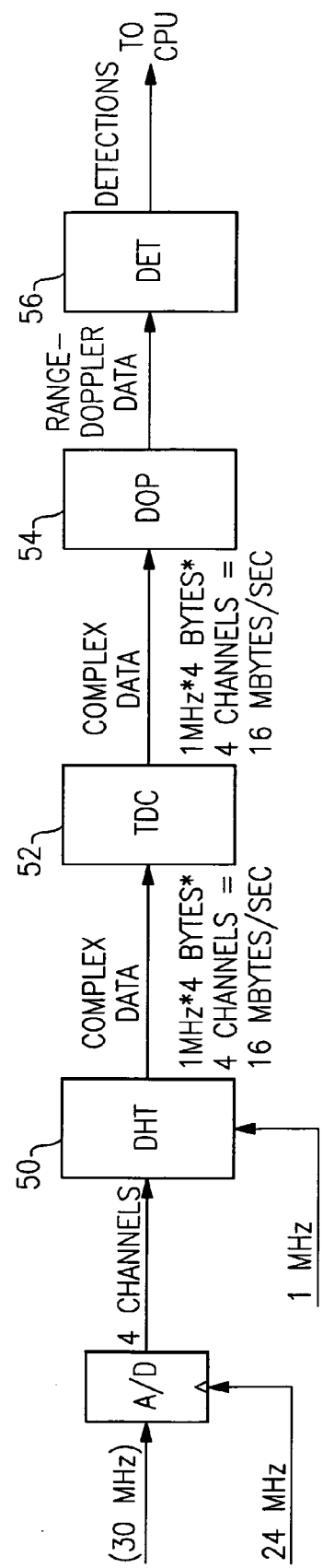
FIG. 21 is a block diagram of the firmware of a digital signal processor according to the present invention.

Referring to FIG. 21, digital signal processor 44 comprises a series of firmware operations including a discrete Hilbert transform (DHT) 50, a time domain correlator (TDC) 52, a Doppler filter (DOP) 54, and target detection (DET) 56.

Discrete Hilbert transform performs digital down conversion and filtering. An integrated FPGA converts the digital IF data to complex in-phase and quadrature data using a digital complex demodulator and pass band filter. The filter may be changed by loading a different set of filter coefficients in a configuration file. Acceptable MCMR System 10 filter characteristics are listed below in Table 1.

TABLE 1

| Parameter | Value |
| --- | --- |
| Input IF | 6.0 MHz |
| Pass band | 0.375 MHz |
| Pass band weight | 1.0 |
| Pass band ripple | −0.21 dB |
| Stop band | 0.675 MHz |
| Stop band weight | 20.0 |
| Stop band ripple | −60.99 dB |

Time domain correlator 52 takes the received data and correlates it against a stored replica or the transmitted pulse, the equivalent of using a matched filter. Because all MCMR waveforms use linear FM coding with a 1 MHz excursion, this operation results in a compressed pulse width of approximately 1 microsecond.

Doppler filter (DOP) 54 is carried out using a 128 or 256 point FFT operation. The number of points in the FFT is equal to the number of pulses in a radar dwell. In normal operation, MCMR 10 uses 128 or 256 pulses per dwell. However, other dwell modes, such as 512 or 1024 pulses, are available for use. The two-dimensional array of range-Doppler cell data generated by Doppler filter 54 is stored in memory and accessed by target detection module 56. Parameters for Doppler filter 54 for three commonly used PRI dwells are listed in Table 2 below.

TABLE 2

| PRI (microseconds) | Number of Pulses per dwell | Maximum Unambiguous Velocity | Doppler Filter Bandwidth (Hz) |
| --- | --- | --- | --- |
| 50 | 128 | +/−1154 | 156.250 |
| 50 | 256 | +/−1154 | 78.125 |
| 100 | 256 | +/−577 | 39.063 |

Target detector 56 is accomplished by using a sliding window constant false alarm (CFAR) detector. CFAR detector options are show in Table 3 below. Detector 56 also carries out bump detection in both range and Doppler to reduce the number of detections caused by large targets.

TABLE 3

| Parameter | Options | MCMR Setting |
| --- | --- | --- |
| Target cell position | Leading, center, trailing | Center |
| CFAR dimension | Range, Doppler | Range |
| CFAR length | 4, 8, 16, 32, 64, 128, 256 | 32 |

Figure 22:
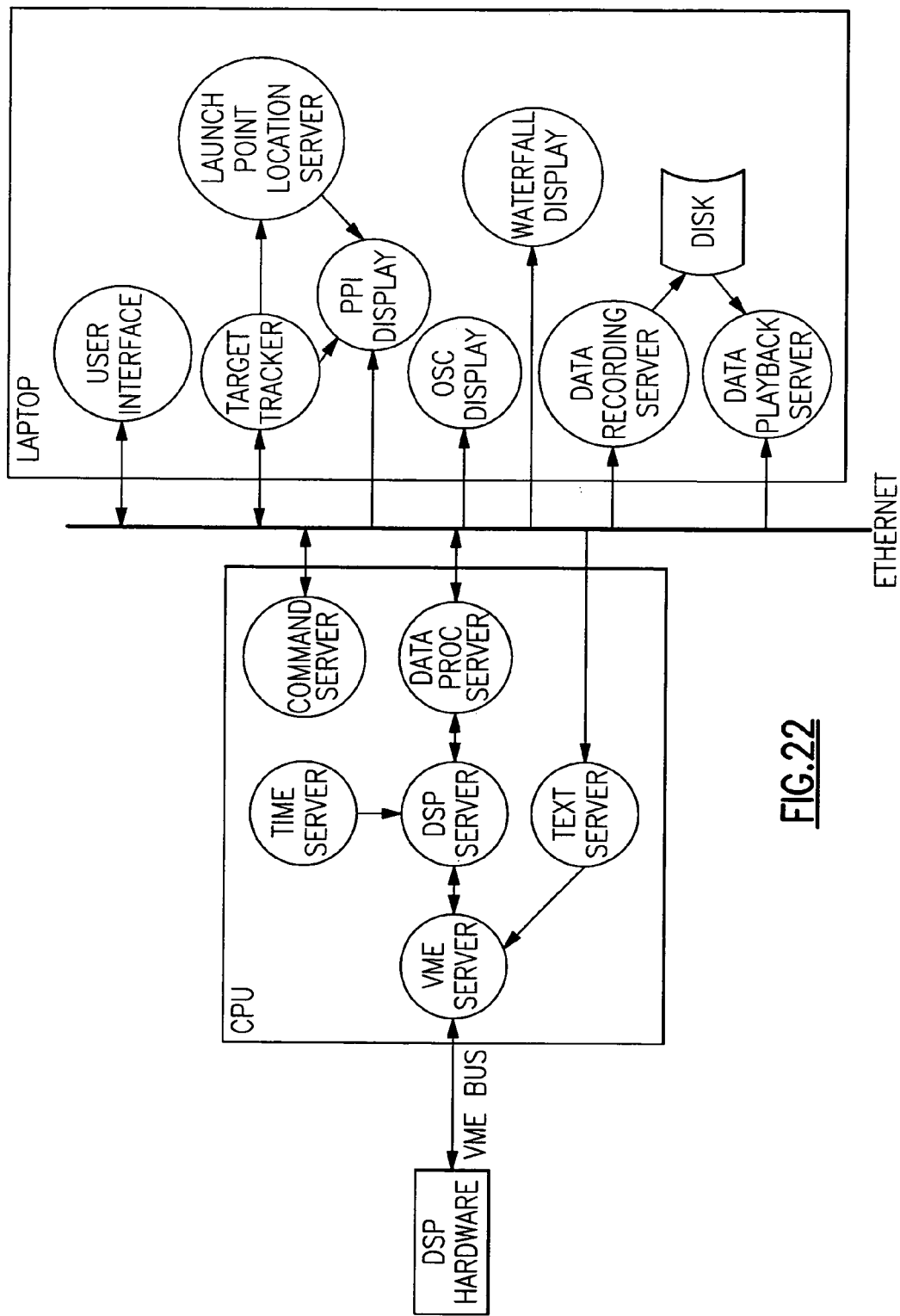
FIG. 22 is a block diagram of software for operating a MCMR according to the present invention.

Referring to FIG. 22, software installed on laptop 16 provides radar control, data processing, information display, data recording, and playback capabilities. It should be understood that a variety of software implementations are possible for managing and displaying the reading obtained by MCMR 10. Similarly, a variety of graphical user interfaces are possible for enhancing user operation of MCMR 10. For example, custom windows may be designed for the entry of radar parameters and controls as well as turning the radar on and off. Similarly, software may provide a plan position indicator (PPI) display for tracking relative motion of targets, an oscilloscope display for visualizing the contents of DSP 44 memory, or a waterfall display of historical parameters and targets detected by MCMR 10.

What is claimed is:

1. A portable radar, comprising:
   a housing for securely storing antenna electronic components therein;
   a plurality of antenna panels each interconnected to said housing and electrically connected to said antenna electronic components; and
   a ground engaging member on which said housing is removably mounted.

2. The portable radar according to claim 1, wherein said housing is cylindrical in shape.

3. The portable radar according to claim 2, wherein said plurality of antenna panels each extend in a respective plane, all of which are vertically oriented when said panels are connected to said housing.

4. The portable radar of claim 3, wherein said plurality of antenna panels are arranged in circumferential relation to said housing with each panel extending radially outward from said housing and in spaced relation to adjacent panels by a predetermined radial amount.

5. The portable radar of claim 4, wherein said predetermined radial amount is about 15 degrees.

6. The portable radar of claim 1, wherein said ground engaging member is a tripod.

7. The portable radar of claim 1, further comprising a plurality of ground planes each of which is connected between adjacent ones of said plurality of antenna panels.

8. The portable radar of claim 1, further comprising a scope attached to said housing for aligning the radar.

9. The portable radar of claim 1, further comprising a first ring having a plurality of radially extending, spaced apart slits formed therein, attached to said housing, wherein each of said slits is adapted to receive a respective one of said plurality of antenna panels therein.

10. The portable radar of claim 9, further comprising a second ring, each of said first and second rings having a plurality of radially extending, spaced apart slits formed therein, and connected to said housing.

11. The portable radar of claim 10, wherein said housing has a top end and a bottom end, said first ring is positioned adjacent said top end, and said second ring is positioned adjacent said bottom end.

12. The portable radar of claim 11, wherein said first and second rings are positioned with their respective plurality of slits aligned in respective common vertical planes with one another.

13. A portable radar, comprising:
   a housing adapted for securely storing antenna electronic components therein;
   a plurality of essentially planar, antenna panels removably interconnected to said housing and extending outward therefrom and in spaced relation to one another.

14. The portable radar of claim 13, wherein said housing is cylindrical and said plurality of panels extend radially outward from said housing and in radially spaced relation to one another.

15. The portable radar of claim 13, further comprising a plurality of ground planes each of which is connected between adjacent ones of said plurality of antenna panels.

16. The portable radar of claim 13, further comprising a scope attached to said housing for aligning the radar.

17. The portable radar of claim 13, further comprising a first ring having a plurality of radially extending, spaced apart slits formed therein, attached to said housing, wherein each of said slits is adapted to receive a respective one of said plurality of said panels therein.

18. The portable radar of claim 17, further comprising second rings, each of said first and second rings having a plurality of radially extending, spaced apart slits formed therein, and connected to said housing.

19. The portable radar of claim 18, wherein said housing has a top end and a bottom end, said first ring is positioned adjacent said top end, and said second ring is positioned adjacent said bottom end.

20. The portable radar of claim 19, wherein said first and second rings are positioned with their respective plurality of slits aligned in respective common vertical planes with one another.

* * * * *